March 30, 1965  B. R. A. REFFELL  3,175,790
ESCAPE SYSTEM
Filed July 1, 1963  2 Sheets-Sheet 1

INVENTOR
BRIAN RICHARD ARNOLD REFFELL
BY Ernest A. Jensen
ATTORNEY

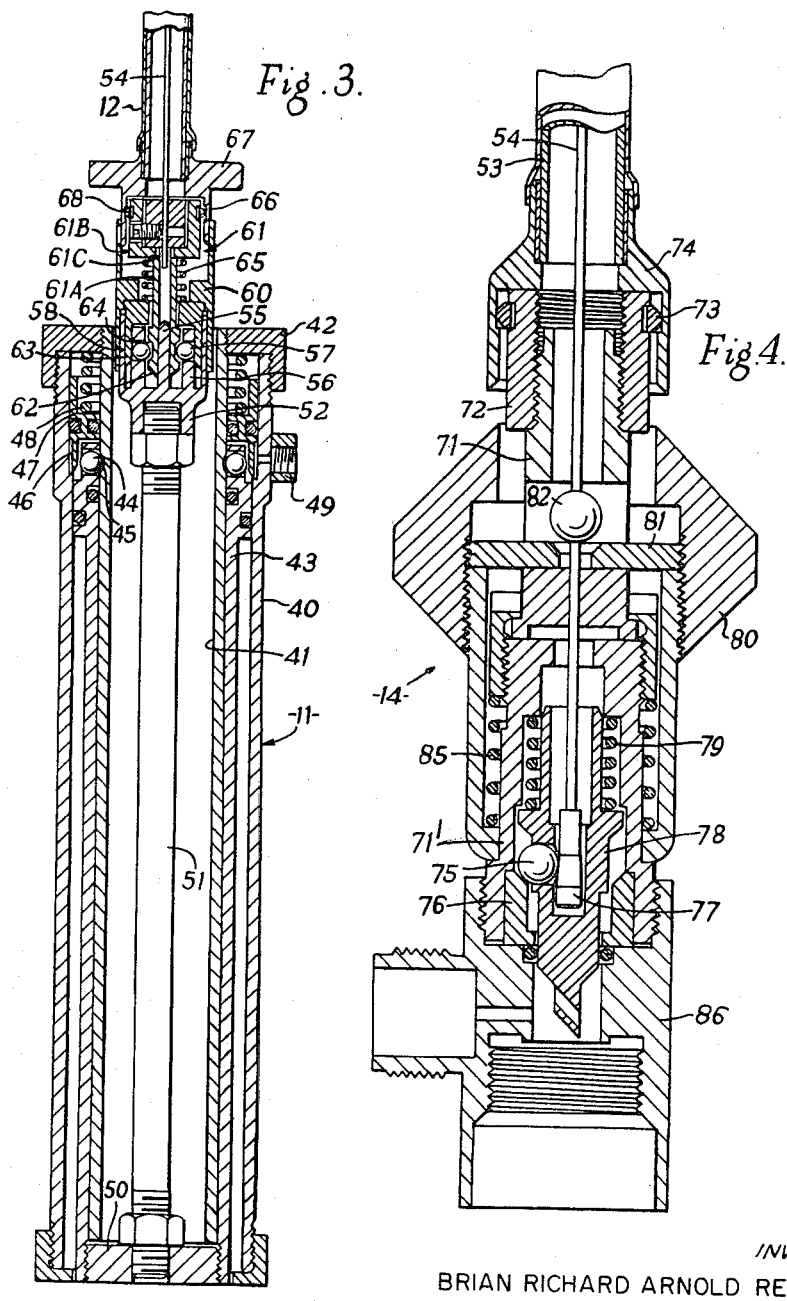

United States Patent Office 3,175,790
Patented Mar. 30, 1965

3,175,790
ESCAPE SYSTEM
Brian Richard Arnold Reffell, Southall, Middlesex, England, assignor to The Walter Kidde Company Limited, Greenford, Middlesex, England, a British company
Filed July 1, 1963, Ser. No. 291,845
Claims priority, application Great Britain, July 3, 1962, 25,408/62
7 Claims. (Cl. 244—122)

The present invention relates to an escape system incorporating means for effecting separation of the occupant from an aircraft ejector seat and for automatic inflation of a life jacket worn by the occupant.

It is already known to cause separation between the seat and the man after ejection from an aircraft by means of one or more inflatable bladders or cushions positioned between the man and the seat, the inflation of the cushion by release of gas from a high pressure gas storage container having the effect of producing a relative acceleration between the man and the seat.

It is an object of the present invention to provide a system for automatically inflating a life jacket worn by the occupant of the seat, substantially simultaneously with the inflation of the bladder or cushion positioned between him and the seat. The inflation of the life jacket is, however, separate from the inflation of the bladder.

In constructing such a system it is desired that its components are carried on the seat so far as is possible, so that the weight on the life jacket, which would hamper the movements of the wearer in the water, is kept as low as possible.

It is further desirable, since there must be a physical connection between the components mounted on the seat and components carried by the life jacket, that unexpected movemetns of the man, such as might occur in getting out of the aircraft, shall not thave the effect of causing the inflation of the life jacket.

Having taken all these factors into account there is provided, according to the present invention, an escape system for separating the occupant from an aircraft ejector seat and for automatically inflating a life jacket worn by such occupant on separation of such occupant from the ejector seat, comprising an actuator for a first gas storage receptacle for releasing gas therefrom to at least one ejector seat bladder, secured to the ejector seat and interposed between the occupant and the ejector seat, and to a means for operating a second actuator for a second gas storage receptacle, carried on the life jacket for inflating the same, the operating means being secured to the ejector seat and comprising a piston in a cylinder, the piston being connected by a flexible connecting means with a locking member in the second actuator, the withdrawal of the member from a locking position in the second actuator causing the same to be operated, the locking member being withdrawable out of the body of the second actuator, the flexible connecting means being housed within a conduit connected to the second actuator and the operating means, the connection constituted thereby including at least one connector adapted to be disconnected when subjected tension in excess of a predetermined value exerted thereon, the flexible connecting means being connected to the piston of the operating means through a quick release coupling means. The flexible connecting means preferably includes a lost motion device intermediate its ends.

One construction made in accordance with the present invention is shown in the accompanying drawings, wherein:

FIGURE 3 is a longitudinal section of the operating means for the second actuator, and FIGURE 4 is a longitudinal section of the actuator for releasing gas from a second gas storage receptacle.

Figure 1:
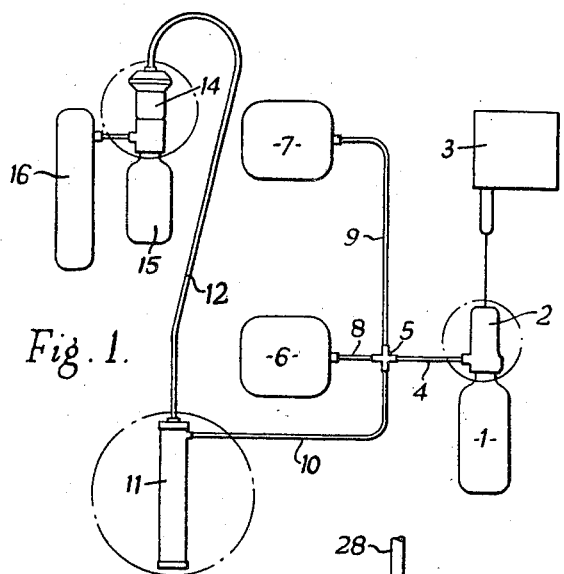
FIGURE 1 is a diagrammatic representation of the system.
Figure 5:
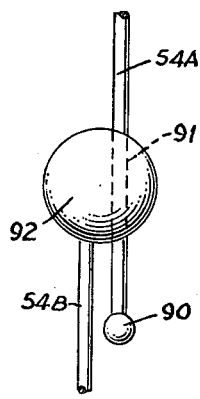
FIG. 5 is a fragmentary elevational view of a lost motion device for a flexible operating element.

Considering FIGURE 1 first of all, it will be seen that the system comprises a first gas storage receptacle 1 fitted with an actuator 2 for releasing gas from it. The actuator 2 is itself operated by means of an operating means 3, which may be barometrically controlled or manually operated to initiate the separation of the occupant from an ejector seat (not shown). Gas released from the first storage receptacle 1 passes through a pipe 4 to a restrictor unit 5. In the present example the seat is fitted with an inflatable seat cushion bladder 6 and a smaller inflatable head cushion bladder 7. The seat cushion in fact extends around the angle between the seat and the back; that is, the seat cushion is situated partially along the bottom of the ejector seat pan and partially up the back of the seat and is situated beneath a liferaft pack, thus producing an upward and forward force on inflation. The head cushion produces a forward force on inflation and displaces the parachute horseshoe off its retainer on the ejector seat. The forward movement of the occupant on inflation of this cushion prevents the entanglement of harness straps, parachute and occupant with the ejector seat, which might ensue if the occupant were moved upwards only. Gas is supplied to the bladders 6 and 7 through pipes 8 and 9 and restricted orifices (not shown) leading to the pipes 8 and 9 are provided in the restrictor unit 5. The size of the restricted orifices is such that the pressures built up in the two bladders 6 and 7 are substantially equalised and at the same time obviates the risk of bursting of the bladders by excessively rapid inflation. The bladders 6 and 7 additionally are fitted with pressure relief valves to protect them against bursting.

Gas released from the first storage receptacle 1 is transmitted through a pipe 10 to an operating means 11, carried on the ejector seat. The operating means 11 will be described below in detail with references to FIGURE 3 and includes a piston secured to a cable lying within a flexible conduit or sheath 12 which connects the operating means 11 with an actuator 14 for releasing gas from a second storage receptacle 15 to inflate a life jacket, shown diagrammatically at 16. The actuator 14 and second gas storage receptacle 15 are secured to the life jacket itself.

It will thus be seen that the actuation of the barometrically and/or manually controlled release means 3 initiates both the separation of the occupant from the seat and the inflation of the life jacket 16. The release means 3 are, of course, maintained in a locked condition so long as the ejector seat remains in position in the aircraft. It follows, therefore, that manual means must also be provided to enable the actuator 14 to be manually operated so that the life jacket 16 may be inflated at will.

Figure 2:
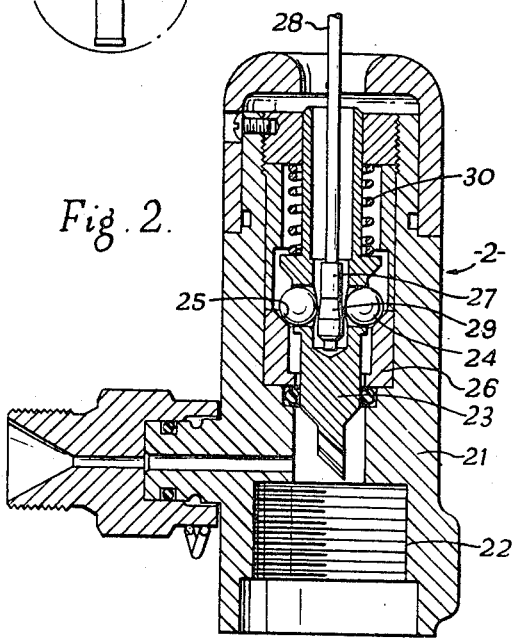
FIGURE 2 is a section of the actuator for releasing gas from a first gas storage receptacle.

Referring now to FIGURE 2, it will be seen that the actuator 2 for releasing gas from the first gas storage receptacle 1 is of simple construction and comprises a body 21, having a screw threaded socket 22 to receive the neck of a sealed capsule, which forms the gas storage receptacle 1. A spring-loaded striker pin 23 is held in a cocked position in the body 21 by means of locking balls 24, positioned in recesses in the side wall of the tail end of the striker pin 23. The balls 24 engage upon a chamfered shoulder 25 in an insert 26 and are held in a radially projecting position by means of a tapered slug 27 secured to the end of a cable 28. The slug 27 has a part conical face 29, so that the slug 27 cannot be withdrawn from its position between the balls 24 until the pull on the cable 28 is sufficient to compress the striker pin spring 30 slightly. This avoids the risk of accidental actuation of the actuator 2.

The full pressure of the gas released from the gas storage receptacle 1 is applied to the operating means 11 shown in FIGURE 3, and there is no restricted orifice in the passage between the storage receptacle 1 and the operating means 11. The operating means 11 comprises an outer cylinder member 40 and an inner cylinder member 41, joined to each other by a spacer cap member 42 at their upper ends. An actuating piston 43 is positioned in the annular space between the members 40 and 41 and is ordinarily locked against longitudinal movement by locking balls 44 which engage in a shallow recess 45 formed in the outer surface of the member 41. These locking balls 44 are held against outward radial movement by means of a skirt 46 of a locking piston 47 which is pressed downwardly by means of a spring 48. When gas is admitted to the annular space between the members 40 and 41 through the inlet port 49, to which the tube 10 is connected, the initial movement to take place is the upward movement of the locking piston 47 to compress the spring 48 and thus permit outward movement of the balls 44. The actuating piston 43 is then free to move outwardly along the space between the members 40 and 41. The operating means 11 is designed to give a piston travel of 6–8 inches. The actuator piston 43 is connected to an end disc 50 to which is secured a rod 51 extending axially of the operating means 11 and carrying a coupling member 52 at its top end. The coupling member 52 is designed to couple the rod 51 both to the outer conduit 12 and the inner cable 54 by means of which the operating means 11 is connected to the actuator 14. The coupling member 52 is provided with an axial tongue 55 surrounded by a ring 56 which is apertured to receive locking balls 57. A ball retaining and guide ring 58 is provided around the ring 56. The space between the ring 56 and the axial tongue 55 on the one hand and the retaining ring 58 on the other hand is such that the balls 57 are trapped.

The coupling member 52 is connectable with the conduit 12 and the cable 54 by means of a coupling which comprises an outer member 60 and a hollow inner member 61 having a head portion adapted to fit over the axial tongue 55. The member 61 comprises a sleeve 61A having an enlarged head 62, which prevents a skirt 63 on the member 60 from passing between the retaining ring 58 and the ball carrying ring 56 until the balls 57 have engaged in an annular recess 64 in the member 61. This prevents the member 61 from being withdrawn so long as the member 60 remains in position. The member 60 conveniently comprises two tubular parts fitted together, as shown, and is pressed downwardly by means of a light spring 65 bearing against an abutment provided by the underside of a cup 61B which is swaged onto a spigot 61C formed on the end of sleeve 61A. The member 60 may be slid upwardly against the resistance of the spring 65 on a cylindrical portion 66 of an abutment member 67 secured to the end of the conduit 53.

The member 61 is held in the position shown in FIGURE 3 by means of a circular clip 68 recessed into an annular groove in the cup 61B, and it may be separated from the member 67 by a downward pull exceeding a predetermined value. It will be appreciated that the members 60 and 61 can readily be coupled and uncoupled from the member 52 by sliding the member 60 upwardly against the resistance of the spring 65.

When the operating means 11 is actuated by the admission of gas under pressure through the inlet port 49, the piston 43 moves downwardly, after being released by the upward movement of the piston 47, and this draws the coupling parts 60 and 61 downwardly until the abutment member 67 is arrested by the top end cap 42. Further movement of the piston 43 then separates the member 61 from the abutment member 67 by breaking the limited engagement afforded by the circular clip 68. At the same time the member 60 is carried down with the member 61, so that the cable 54 remains coupled to the operating rod 51. The conduit 12 is made flexible to avoid hampering the occupant of the ejector seat and is likewise made so as to have a certain degree of extensibility. To avoil actuation of the actuator 14 in the event of the conduit 12 being stretched lengthwise, a lost motion coupling is provided in the cable 54. The cable 54, as shown, is in two halves 54A and 54B, which are connected together by means of a ball 90 secured to the end of one half 54A which passes through an aperture 91 in a ball 92 connected to the other half 54B, in such manner that the one half 54A of the cable can slide through the aperture in the ball 92 connected to the other half 54B until the ball 90 carried on the first half comes up solid against the ball 92 in which the aperture is formed.

The life jacket actuator 14 is shown in FIGURE 4 and has a body 71, to the tail end of which is secured a collar 72, which is connected by means of a circular clip 73 to a coupling member 74, secured to the end of the cable conduit 53. It will thus be seen that the conduit 12 can be separated from the actuator 14 by a lengthwise pull.

The actuator 14 is provided with an inner body 71′, in which a striker pin 78 is guided for longitudinal movement under the force of its spring 79 and is held in a cocked position by means of balls 75 which engage against a shoulder of an insert 76. The balls 75 are held in a radially projecting position by means of a slug 77. The actuation and release of the striker pin 78 is performed by the withdrawal of the slug 77 in a manner identical with that employed in the actuator shown in FIGURE 2 and which therefore needs no further explanation.

It will be appreciated that the movement of the piston 43 in the operating means 11 will withdraw the slug 77 after the lost motion in the cable 54 has been taken up.

It is also desirable to provide a manual means for operating the actuator 14. This is achieved by providing a manual operating knob 80 on the outer surface of the outer body 71 of the actuator 14. A centrally apertured disc 81 is connected within the knob 80 and has an aperture of such size that the slug 77 may pass through it. A ball 82 is secured to the cable 54 and is of greater diameter than the aperture in the disc 81, so that upward movement of the knob 80 in FIGURE 4 against the force of the restoring spring 85 withdraws the slug 77 from its position and thus releases the striker pin 78 to rupture a seal of the gas storage capsule 15 threaded into a socket member 86.

There is thus provided a system by which a life jacket carried by the occupant of an aircraft ejector seat may be inflated automatically on separation of the man from the seat as the result of ejection from an aircraft, or which may be operated manually by the wearer in the event of his leaving the aircraft without operation of the ejector seat after a crash landing in the water.

I claim:

1. An escape system for separating the occupant from an aircraft ejector seat and for automatically inflating a life jacket worn by such occupant upon separation of such occupant from the ejector seat: which system comprises at least one ejector seat cushion bladder; a first gas storage receptacle; an actuator for releasing gas therefrom; conduit means connecting said actuator and said bladder; a second gas storage receptacle; a second actuator for said second receptacle including a withdrawable locking member; an inflatable life jacket; conduit means connecting said second actuator to said life jacket; and means for operating said second actuator including a cylinder, a piston in said cylinder, a flexible element connecting said piston and said locking member for effecting withdrawal thereof upon actuation of said piston, a conduit for housing said flexible element, connectors for connecting said housing to said operating means and said second actuator, at least one of said connectors being disconnectable when said housing is subjected to tension in excess of a predetermined value exerted thereon, conduit means connecting said first mentioned actuator to said cylinder for actuation of said piston, and quick release coupling means for connecting said flexible element to said piston.

2. An escape system according to claim 1, further comprising manually operable means associated with said second actuator for withdrawing the locking member thereof from the locking position.

3. An escape system according to claim 2, wherein said manually operable means includes an apertured member connected to a manually graspable member, the aperture in said member being sufficiently large to permit the passage of the locking member of said second actuator therethrough, said apertured member co-operating with a protuberance on said flexible element which passes through said apertured member to permit said locking member to be withdrawn from the locking position by movement of said manually graspable member.

4. An escape system according to claim 1, wherein both of said connectors are adapted disconnect when subjected to tension in excess of a predetermined value.

5. An escape system according to claim 1, including more than one ejector seat cushion bladder, a restrictor interposed in said first mentioned conduit means for gas from the first actuator to each bladder, the size of such restrictors being arranged in relation to each other so that the pressure of gas in all said bladders builds up at approximately the same rate.

6. An escape system according to claim 1, including a lost motion device in said flexible connecting element intermediate its ends.

7. An escape system according to claim 1, including a locking means for said piston of said operating means, said locking means being adapted to disconnect automatically on admission of gas under pressure to said cylinder of said operating means.

References Cited by the Examiner
UNITED STATES PATENTS

| | | | |
|---|---|---|---|
| 2,813,690 | 11/57 | Holmes | 244—122 |
| 2,925,011 | 2/60 | Musser | 244—122 |
| 3,027,126 | 3/62 | Wallace | 244—141 |
| 3,105,981 | 10/63 | Bennett | 9—316 |
| 3,110,455 | 11/63 | Oliveau | 244—122 |

FERGUS S. MIDDLETON, *Primary Examiner*.